Aug. 10, 1926.

J. J. ROGACH 1,595,733

CALIPERS

Filed Feb. 6, 1926

JOSEPH J. ROGACH
INVENTOR

BY
John P. Nikonow
ATTORNEY

Patented Aug. 10, 1926.

1,595,733

UNITED STATES PATENT OFFICE.

JOSEPH J. ROGACH, OF BROOKLYN, NEW YORK.

CALIPERS.

Application filed February 6, 1926. Serial No. 86,522.

My invention relates to calipers and has a particular reference to calipers provided with an attachment for measuring distances or openings between the caliper legs.

The object of my invention is to provide calipers of any ordinary type, such as internal or external calipers, compasses, dividers, etc., with an attachment, operated by the adjusting screw of the calipers, this attachment being in the form of an indicating wheel with divisions calibrated to indicate the correct distances between the caliper legs. My attachment, of course, can be used only with such types of calipers as are provided with an adjusting screw.

My invention is more fully described in the accompanying specification and drawing in which—

Figure 1:
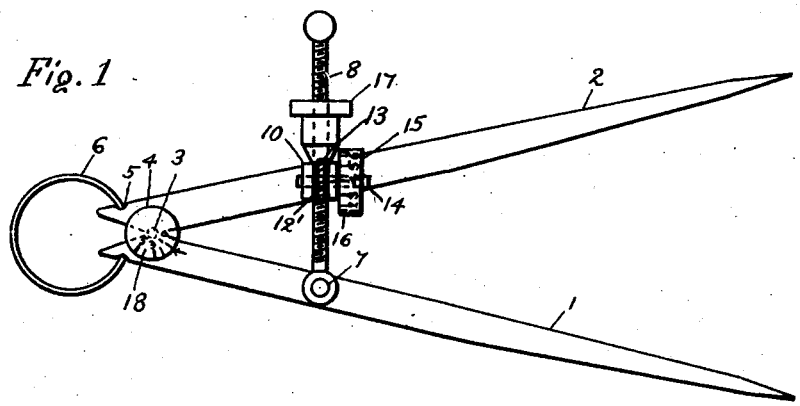
Figure 2:
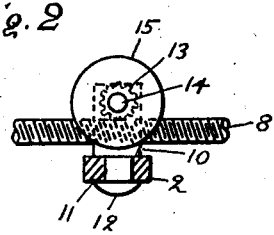
Figure 3:
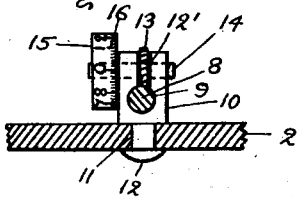

Fig. 1 is a general view of my calipers, Fig. 2 is a side view partly in section and on an enlarged scale of my indicating attachment, and Fig. 3 is an end view of same partly in section.

My calipers comprise legs 1 and 2 resting with their rear ends on a pivot 3 with large flat heads 4 on both sides. On the rear side of the pivot the legs are provided with notches 5 for the end of a circular flat spring 6 which tends to open or spread apart the legs of the calipers.

The leg 1 has a pin 7 on the side on which the end of an adjusting screw 8 is pivoted. The screw is passing through an aperture 9 in a block or post 10 which is mounted on the leg 2. The end of the post 10 slidably fits in a hole 11 in the leg 2 and is retained with a head 12 which may be formed by riveting the end of the post. After riveting the post must be loosened sufficiently to permit its rotation in the hole 11.

The post is provided with a slot 12' for a small gear wheel 13 engaging the threads of the screw 8. The gear 13 is fastened on a shaft 14 journaled in the sides of the post 10.

An indicating wheel 15 is attached to the exposed end of the shaft. This wheel is calibrated on its periphery so that distances between marks 16 indicate in adapted standard measures distances between the legs 1 and 2. Accordingly the marks 16 have numerals 0, 1, 2 etc. stamped or engraved on the wheel 15.

In actual practice I have found convenient to make the distance between the point of the caliper legs to the screw three times the distance between the screw and the pivot 3, so that distances along the screw are four times smaller than distances between the leg points. The screw 8 may be made with 32 threads per inch, each thread corresponding to 1/8 of an inch between the leg points.

The gear 13 is made of a small diameter so as to provide large angular rotation for each movement of the legs 1 and 2. The wheel 15 is substantially larger than the wheel 13, so that each large division 1, 2, 3 etc., corresponding to 1/8" between the legs 1 and 2, can be further subdivided into 8 parts, each corresponding to 1/64" between the legs, which is quite sufficient for ordinary measurements, as for more accurate measurements micrometers are used.

The adjusting nut 17 may be of any ordinary construction.

For indicating large distances, for instance, inches, I provide divisions 18 on the stance, head 4 of the pivot 3. A special indicating or starting mark 18 is placed on the leg 1 for counting the number of divisions 18, or number of full inches of opening of the calipers. A convenient arrangement may be obtained by making the wheel 13 with 8 teeth so that its one complete turn corresponds to one inch opening and one full division 18. By making 8 divisions on the wheel 15, each division will correspond to 1/8" between the legs.

Of course, the divisions may be made in any convenient system of measurement, for instance, in metric system.

The circular head 4 or the pivot 3 may be attached to the leg 2.

Important advantages of my attachment to calipers are, that this attachment can be used with any ordinary calipers or compasses which use adjusting screw, and that with this attachment it is not necessary to use measuring rule every time when the calipers are used for measuring distance between the caliper legs.

This attachment is also very compact and does not render the calipers larger than their ordinary size, also that the readings are convenient and accurate within practical limits.

I claim as my invention:

1. In calipers, the combination with an adjusting screw adapted to control distances between the legs of said calipers, a gear wheel adapted to be operated by said screw, an indicating wheel connected with said gear wheel, a pivot connecting one end of said screw with one leg of said calipers, a post rotatively mounted on the other leg of said calipers and provided with an aperture for said screw, an adjusting nut on said screw, a shaft for said gear wheel, an indicating wheel, said gear wheel and said indicating wheel being attached to said shaft, said post being provided with a slot for said gear-wheel, said shaft being journaled in the sides of said slot.

2. In calipers, the combination with an adjusting screw adapted to control distances between the legs of said calipers, a gear wheel in an engagement with said screw, an indicating wheel for said gear wheel, a common shaft for said gear wheel and said indicating wheel, a post rotatively mounted on one leg of said calipers and provided with an aperture for said screw, said post being adapted to support said wheels and said shaft, the location of said post on the leg of said calipers, the pitch of said screw and the diameter of said gear wheel being so proportioned that one revolution of said indicating wheel corresponds to one unit of length between the legs of said calipers.

Signed at Brooklyn in the county of Kings and State of New York.

JOSEPH J. ROGACH.